Sept. 12, 1939. W. H. HOWE 2,172,474
CORRECTING CONTROL METHOD AND MECHANISM
Original Filed July 25, 1933 3 Sheets-Sheet 1

INVENTOR.
Wilfred H. Howe
BY
Wright Brown Quinby & May
ATTORNEYS.

Sept. 12, 1939.  W. H. HOWE  2,172,474
CORRECTING CONTROL METHOD AND MECHANISM
Original Filed July 25, 1933  3 Sheets-Sheet 2

INVENTOR.
Wilfred H. Howe
BY
Wright Brown Quinby May
ATTORNEYS.

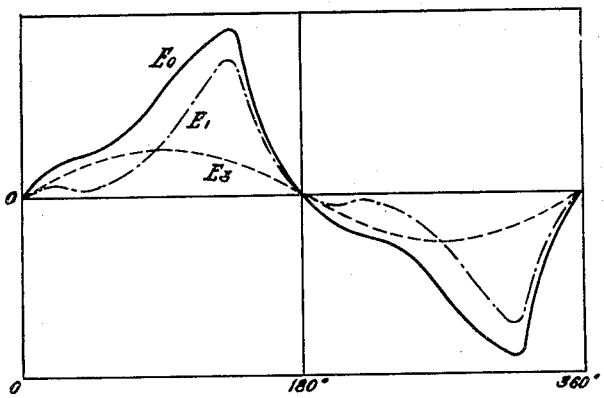
Fig. 6.
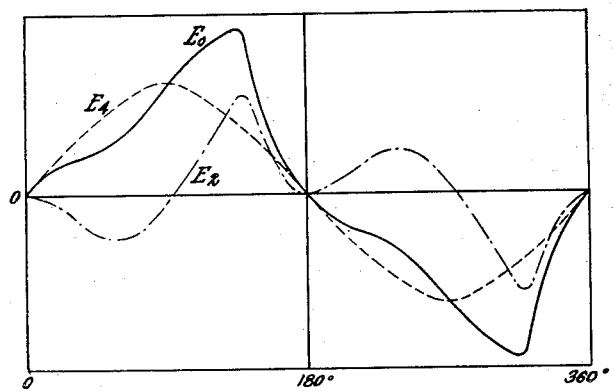
Fig. 7.
Fig. 9.
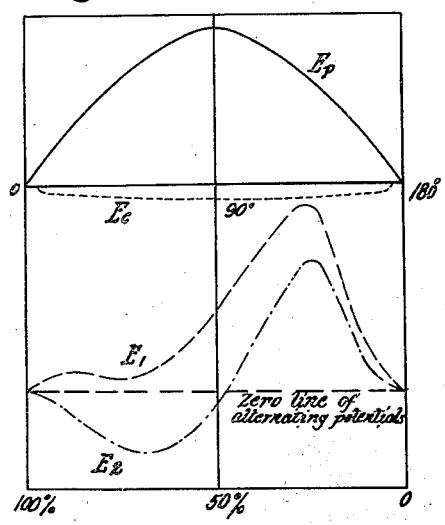
Fig. 8.
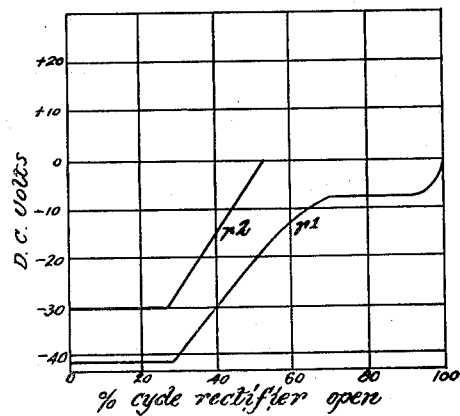
INVENTOR.
Wilfred H. Howe
BY
ATTORNEYS.

Patented Sept. 12, 1939

2,172,474

UNITED STATES PATENT OFFICE 2,172,474

CORRECTING CONTROL METHOD AND MECHANISM

Wilfred H. Howe, Winchester, Mass., assignor, by mesne assignments, to The Foxboro Company, Foxborough, Mass., a corporation of Massachusetts Original application July 25, 1933, Serial No. 682,120. Divided and this application November 8, 1935, Serial No. 48,900

9 Claims. (Cl. 236—78)

There are many situations in the industrial arts where it is desirable to maintain certain conditions as constant as possible and where there are unavoidable variables, the variation of which, unless compensated for, causes departure from the desired constancy of such conditions. In many cases, also, the controllable compensations are not immediately fully effective in producing correcting actions, and likewise their correcting effects, once having been set into action, persist even after the need for them has terminated. The resultant effect of lag between the application of compensatory actions and their resultant effects on the conditions which it is desired to maintain constant, is thus to produce fluctuations in both directions from the desired constant value.

The present invention has for an object to speed up the effectiveness of the correcting in case of wide departures from the desired constant values in either direction by effecting maximum changes in the compensating means without regard to the precise extent of such departures, and reducing such corrective changes as the conditions to be controlled approach the desired normal to values in some manner proportional to the extent of departure from normal.

This invention also has as a more specific object the utilization of an electrically operated compensation control having highly desirable inherent characteristics such that the desired control is readily produced.

While it should be understood that the invention is capable of many applications, its application is particularly described herein with reference to drying mechanism, and more specifically with reference to the regulation of the supply of steam to the drying rolls of a paper or other similar web drying apparatus.

It is highly desirable that paper be delivered from a paper machine with a moisture content within rather definite narrow limits. There are, however, many uncontrollable factors tending to cause variation of such moisture content and the compensatory control is accomplished through corrective variations of the steam supplied to the drier rolls so that should the paper come off too wet the supply of steam is increased, and should it come off too dry, the supply of steam is decreased.

In accordance with the present invention this control of the steam supply is made responsive in amount proportional to the extent of departure of the moisture from the desired content within relatively narrow limits, and is caused to be a maximum whenever the moisture content deviates beyond these limits and regardless of the extent of such departure.

One method by which such action of a corrective regulating mechanism may be effected, is through electric actuation controlled by mechanism having an inherent behavior pattern such that it is responsive in the desired manner to measuring mechanism, which, in turn, is responsive to the moisture content of the paper or other material being dried. As will later appear, such behavior pattern may be so selected as to take account of the particular behavior patterns of the particular moisture-responsive means, of the particular power controlling means, and of the steam supply control, or, indeed, of any mechanism used in the entire system having behavior characteristics which of themselves would have effect on the ultimate characteristic to be controlled. Such electric power control may be produced readily by an ionic valve having a plurality of electrodes between which a cyclic voltage differential is applied, this differential periodically reaching such value as to stop the flow of current once started, and with a separate control of opening time to start flow of current on which may be impressed a cyclic voltage having such a pattern as to produce the desired control of the correcting mechanism in response to variation in the condition to be controlled.

It is characteristic of valves of the thermionic gas-filled type having separate control of ignition time that whenever during the positive plate voltage the controlling voltage reaches a definite sufficiently positive value, the valve opens and remains open until the voltage differential reaches a value to stop current flow, even though the controlling voltage should fall to a point sufficiently negative so that the valve would not open had it not already been opened. An important attribute of valves of this type is their capability of passing substantial current which can be used directly for actuating controlled motors.

In my Patent No. 2,020,314, granted November 12, 1935, for Method of controlling rectifiers and circuits therefor, of which this application is a division, is disclosed and claimed a method of controlling the output of such valves by variations in a direct current component of a voltage controlling the ignition time of the valve. It is also pointed out in this application that by varying the phase of ignition time controlling cyclic voltage relative to the voltage differential between the electrodes, the position and extent of smooth control by direct current voltage grid component can be varied and the effects of harmonics in the controlling grid voltage are also pointed out.

The present application relates more specifically to this type of control to produce a control voltage pattern, such as to give the desired control of the corrective mechanism from the responsive means. This control pattern may be chosen with respect to the inherent characteristics of the other mechanisms in the system such as the measuring device responsive to the amount of the characteristic which it is desired to control, the corrective mechanism and the power supply controlled by the ionic valve. Such systems generally per se form the subject matter of another copending application.

In the accompanying drawings,

Figures 6 and 7 are curves showing two different values of alternating potential added to the harmonic potential of Figure 5.

Figure 8 is a curve illustrating the effect of applying the voltage shown in Figures 6 and 7 on the rectifier grid.

Figure 9 is a curve showing the plate current resulting from the grid voltage cycles of Figure 8.

Figure 1:
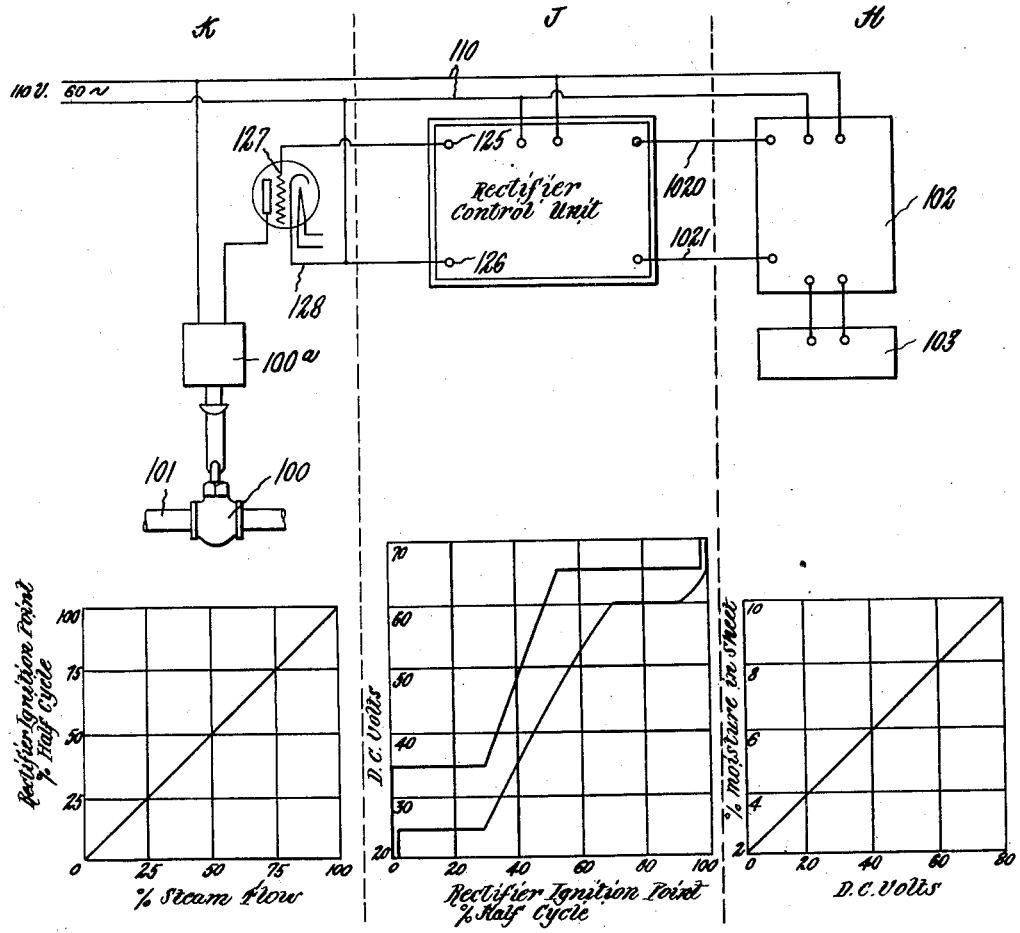
Figure 1 is a diagrammatic view of a steam supply control for a drier and illustrates this invention.

Referring to Figure 1, the mechanism 100a in panel K controls a steam valve 100 in a main 101 which may lead to the drier cylinders (not shown) of a papermaking machine, the valve being controlled from mechanism shown enclosed in the panel H and indicated at 102 and 103. The mechanism 103 may be a hygrometric element responsive to the moisture content of the paper after it leaves the drier, as, for example, as shown in the Allen Patent No. 1,781,153, filed November 11, 1930, and the mechanism 102 is a source of direct current voltage rectified from the alternating current mains 110 and responsive in direct current voltage to the condition of the mechanism 103, its direct current terminals being connected to the leads 1020 and 1021. In the Allen patent hereinbefore mentioned this direct current voltage actuates the moisture indicating instrument.

In the control of the steam valve 100 it is desirable to have the variation of the steam flow proportional to the variation of moisture to which the mechanism 103 responds within a limited range. If the moisture goes outside this range it then becomes desirable to set the steam valve to its extreme position in order that the minimum of paper shall be produced, the moisture content of which lies outside of this range. In other words, when the sheet is very dry the steam should be shut off entirely. When the sheet becomes 1½% drier than that desired, the steam valve should be adjusted to admit an amount of steam slightly less than that presumably necessary to dry the sheet to the desired point. As the sheet continues to become moister the steam flow should be gradually increased in proportion to an increase in moisture up to a point where the sheet is approximately 1½% wetter than the desired value at which point the steam should be turned on full and there left as long as there is any moisture greater than this amount in the paper. There is thus a fixed valve setting corresponding to each value of departure from the desired point of dryness, these fixed valve settings, within the range of proportionality, being dependent on the extent of departure of the moisture from this point and outside of the proportionality range being extreme and the same for all values of departure in the same direction from that desired. The mechanism is also continuously responsive to the controlling conditions. It is apparent that it is necessary to interpose some mechanism between the measuring apparatus in panel H, including the mechanisms 102 and 103, and the steam control apparatus in the panel K, in order to obtain this result. This apparatus is indicated as the rectifier control unit and is shown in panel J. Two available characteristics of this unit are shown in the lower part of this panel in the diagram.

Figure 2:
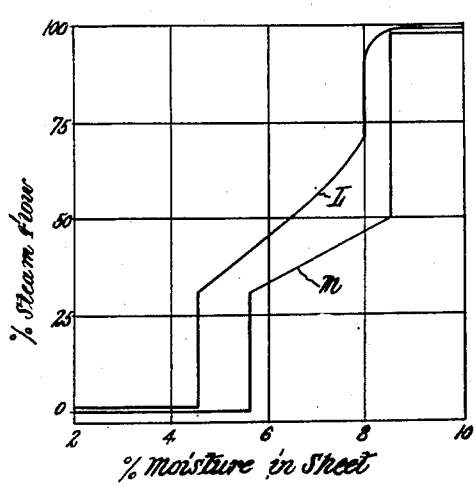
Figure 2 is a diagram showing characteristic relations between the controlling and controlled mechanisms.

Assuming the characteristics of this unit as shown, together with the characteristics of measuring and control apparatus, the resultant characteristic of steam flow plotted against moisture is shown in Figure 2. Two characteristics are there shown marked L and M. Examining curve M it will be noted that for moisture of 5½% or less the steam flow is zero and that for moistures of 8½% or more the steam flow is 100%, or in other words, the steam valve 100 is wide open. For moistures between 5½% and 8½% the steam flow varies from 30% to 50%, this variation being proportional to the variation of moisture in the sheet as affecting the mechanism 103.

Figure 3:
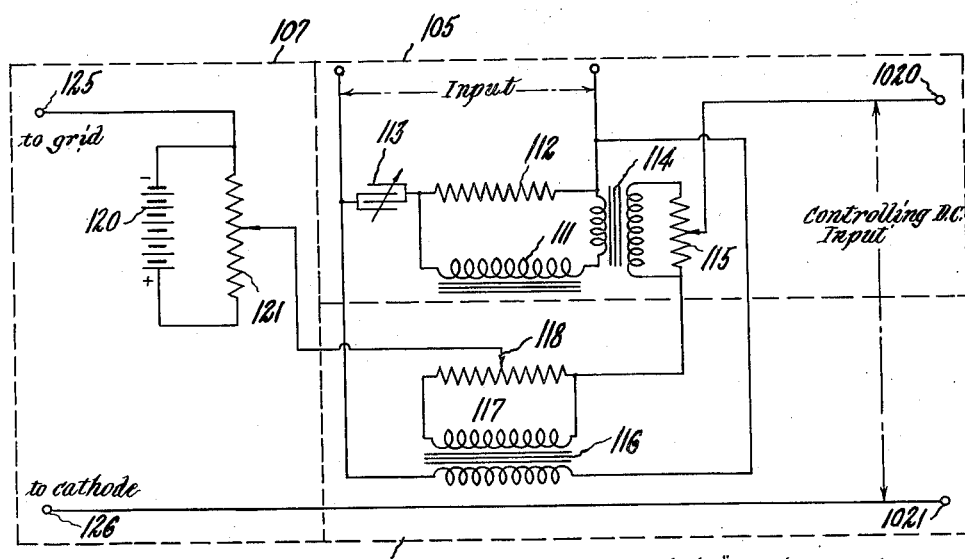
Figure 3 is a wiring diagram of one of the units shown in Figure 1.

Figure 3 shows the circuit of the rectifier control unit indicated in the central panel J of Figure 1 whose characteristic is shown in the diagram in the lower portion of this panel. Referring to Figure 3, this unit consists of three main elements. There is a source of harmonics 105, a source of fundamental frequency cyclic or alternating potential 106, and a source of direct current potential 107, all of which are independently variable and which are shown in Figure 3 set off from each other by dotted outlines. The harmonics arise from an iron cored inductance 111 of three henries value. This is supplied from the line 110 through a resistance condenser combination 112, 113 which shifts the phase of the potential applied to this inductance by 45°. Since the impedance of the resistance 112 and the condenser 113 is approximately 10% of the impedance of the inductance 111, the current through the inductance 111 is about 10% of the total in this circuit so that the current in the inductance 111 and its wave form have substantially no effect on the total. In series with the inductance 111 and between it and one end of the resistance 112 is a current transformer 114 of 1 to 10 ratio across which is connected a 750 ohm resistance 115. This is equivalent to connecting a 7.5 ohm resistance between the inductance 111 and the resistance 112. Since the impedance of the inductance 111 is approximately 1000 ohms the 7.5 ohm series resistance has a negligible effect. However, the potential across the 750 ohm resistance 115 will vary exactly as the current through the inductance 111. It is a well known fact that the magnetizing current in an inductance across which is impressed a sine wave electro-motive force contains a considerable portion of harmonics.

Figure 4:
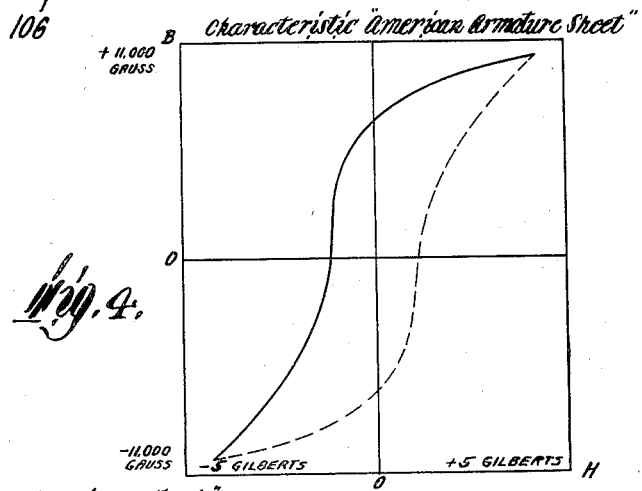
Figure 4 is a diagram of a typical B—H curve for a standard grade of laminated iron.
Figure 5:
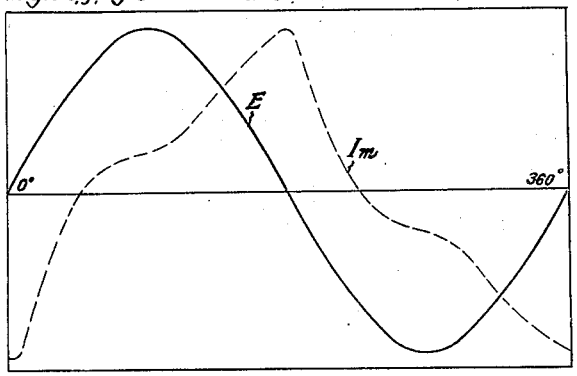
Figure 5 is diagram showing the magnetizing current flowing through an inductance having the core of the iron of Figure 4 and on which inductance is impressed a sine wave electromotive force.

In Figure 4 is indicated a typical B—H curve for a standard grade of laminated iron and in Figure 5 is indicated the magnetizing current $I_m$ which would flow through an inductance having a core of this iron on which there is impressed a sine wave electro-motive force E. It will be noted that the current $I_m$ lags the voltage E by approximately 45° and that this current contains a considerable proportion of harmonic values.

Assuming this current $I_m$ flows through the three henries inductance 111, the voltage across the resistance 115 will vary exactly with the variation of the current $I_m$ of Figure 5. In the circuit the potential E applied across this choke 111 is the same as that across the 100 ohm resistor 112. Since the resistor 112 is connected across the line in series with a capacity 113 of 25 microfarads having an impedance of approximately 100 ohms, the voltage in the resistance 112 will lead the voltage impressed from the line 110 by 45°. In other words, the voltage E shown in Figure 5 leads the impressed voltage from the line by 45°. Since the current $I_m$ lags the voltage E shown by 45°, this current $I_m$ then is in phase with the applied voltage from the line and the voltage across the 750 ohm resistor 115 resulting from the current flow $I_m$ through the 1 to 10 current transformer 114 will likewise be in phase with the impressed potential. This voltage is shown as $E_0$ of Figures 6 and 7. This voltage $E_0$ is the sum of a certain amount of fundamental plus various harmonics.

The second element 106 of the control unit consists of a transformer 116 and resistor 117 which produces a sine wave of alternating potential in phase with and exactly proportional to the input potential from the line 110. This alternating potential is added to the fundamental plus harmonic potential derived from the harmonic source 105. This potential is variable by varying the tap 118 on the 1000 ohm potentiometer 117. Two values of this potential are shown added to the harmonic potentials in Figures 5 and 6. These potentials are designated as $E_3$ and $E_4$ and are subtracted from $E_0$ of these figures giving potentials $E_1$ and $E_2$.

The third section 107 of the control unit in panel J consists of a source of variable direct current potential shown as a battery 120 and a potentiometer 121, all three sections being connected in series and in series with the controlling direct current through leads 1020 and 1021 from the external source and applied as at 125 and 126 between the rectifier grid 127 and the cathode 128 (Figure 1) which rectifier controls the position of the valve actuator 100a shown as a solenoid for opening the gravity-closed valve 100.

Figure 8 indicates the effect of the alternating potential supplied from the harmonic and fundamental source upon the rectifier. As has been previously noted, these characteristics are in phase with the potential applied from the mains 110 which is likewise applied to the plate to cathode circuit of the rectifier. As will be apparent upon inspection, the zero line of the alternating potentials varies up and down due to the direct current of the control unit plus the controlling direct current curves $E_1$ or $E_2$ (Figures 7 and 8) move up and down, intersecting curve $E_c$ which represents the critical value of rectifier cut-off. Curve $E_2$ in the position as shown lies entirely below the curve $E_c$ and hence the tube remains closed. As the zero line and with it $E_2$ move up due to more positive direct current potential the peak of $E_2$ intersects the curve $E_c$ at about 25% full tube opening. In other words, the tube is either all off or at least 25% open. As the zero line continues to rise, the curve $E_2$ intersects the curve $E_c$ at a constantly earlier point until the tube is about 50% open at which point the rising portion of curve $E_2$ at 100% full opening intersects the curve $E_c$ at 0° of the cycle causing the tube to open full. In other words, the tube opens gradually from 30% to 50% and then in a single motion from 50% to 100%. This is shown diagrammatically in Figure 9, in the curve $r_2$. Similarly the action of the characteristic $E_1$ is shown in curve $r_1$ in this figure.

As will be noted, Figure 9 is the same as the lower diagram of panel J of Figure 1, except that the scale of direct current volts has been altered. It is apparent that by varying the direct current potential of the rectifier control unit, the whole curve, Figure 9, may be moved up or down at will. Figure 9 represents the action of the alternating current components supplied by the rectifier control unit. The diagram in panel J, Figure 2, indicates the control as a whole with alternating plus direct potential components.

It is apparent that by varying the fundamental components of the alternating current control any curve value between that shown at L and M of Figure 2 within the limits shown can be produced and that by varying this value outside the limits shown other curves will result. Furthermore, by increasing or decreasing the magnitude by both fundamental and harmonic components the ratio of moisture to steam flow within the smooth variation section can be varied at will. By varying the direct current potential of the rectifier control unit, the entire characteristic of Figure 2 may be moved to the right or left, the action occurring within any desired limits of moisture. Furthermore, by varying the capacity of the condenser 113 of the harmonic source of Figure 3, the harmonic characteristic may be displaced to the right or left thereby varying the minimum amount of steam flow up or down as may be desired. These variations indicate roughly a few of the possibilities. By suitable combinations of resistors, iron inductances, and capacity almost any desired wave form or wave forms can be produced resulting in almost any desired response characteristic of the rectifier control unit and thereby resulting in any desired relationship between the controlling direct current potential and the response of the rectifier and giving any desired relation between sheet moisture and steam flow.

It will be noted that the voltage differential impressed between the plate and cathode is cyclic and periodically reaches a value to stop the flow of current once started, and that a pattern of cyclic voltage suitable to control the ignition time of the ionic valve in the desired manner is employed, this voltage including a direct current control component derived from the responsive mechanism 103.

From the foregoing description of an apparatus illustrating this invention, it will be understood by those skilled in the art that various changes and modifications might be made without departing from the spirit or scope of this invention as defined by the appended claims.

I claim:

1. The method of application of a corrective control to tend toward constancy of a desired characteristic, which comprises continuously effecting such control by said characteristic in amount generally proportional to departures from the desired value of such characteristics within relatively narrow limits, and in amounts larger than at said limits and irrespective of the extent of such departures beyond said limits.

2. The method of application of a corrective control to tend toward constancy of a desired characteristic, which comprises continuously effecting such control by said characteristic in amount generally proportional to departures from the desired value of such characteristic within relatively narrow limits, and beyond said limits in amounts substantially greater than at said limits and substantially constant so long as said characteristic remains beyond said limits.

3. In combination, electrically actuated mechanism effective to change the value of a desired characteristic of material, means for producing a potential proportional to the value of said characteristic, and variable means for controlling said mechanism in response to said potential and setting said mechanism in corrective direction away from a null position corresponding to the value of potential produced by the desired amount of such characteristic by an amount proportional to small departures of said potential from said null position and beyond said small departures by large amounts irrespective of proportionality.

4. For electrically actuated mechanism effective to change a desired characteristic of material through electric means responsive to the amount of said characteristic, means including an ionic valve controlling the supply of electric power to said mechanism, said ionic valve having a plurality of electrodes and a voltage-responsive control of time for start of current flow, means impressing a cyclic voltage differential on said electrodes periodically reaching a value to stop the flow of current already started, and means controlled by said responsive means impressing a cyclic voltage on said control means of a pattern to cause small departures between definite limits from the desired value of said characteristic to produce corresponding small and proportional variations in power passing through said valve and departures outside of said limits to cause large variations in said power flow without regard to the extent of such departures.

5. For electrically actuated mechanism effective to change a desired characteristic of material through electric means responsive to the amount of said characteristic, means including an ionic valve controlling the supply of electric power to said mechanism, said ionic valve having a plurality of electrodes and a voltage-responsive control of time for start of current flow, means impressing a cyclic voltage differential on said electrodes periodically reaching a value to stop the flow of current already started, and means controlled by said responsive means impressing a cyclic voltage on said control means having harmonics so related to the main frequency thereof as to cause said valve to open suddenly part way and then gradually and then suddenly wide open on increase of a control voltage component responsive to a change of said characteristic through a range extending outside of limits within which it is desired to control said electrically actuated mechanism in corrective direction proportional to departures from a desired value of said characteristic.

6. For an electrically actuable drier control mechanism having means responsive to the moisture content of the material dried, means supplying electrical power to said mechanism, said supply means including an ionic valve having a plurality of electrodes and a voltage-responsive control of time for start of current flow, means impressing a cyclic voltage differential between said electrodes periodically reaching a value to stop the flow of current once started, and means impressing on said time control a cyclic voltage having a control component derived from said responsive means and of a pattern to actuate said drier control in corrective direction and to an extent proportional to the extent of departure of moisture content of the material dried from a desired value in either direction between definite limits and to a definite large extent without regard to the extent of such departures beyond said limits.

7. For an electrically actuated fluid control valve and means responsive to characteristics of material effected in amount by the flow of such fluid, means supplying electric power for actuating said control valve including an ionic valve having a plurality of electrodes and a voltage-responsive control of time for start of current flow, means impressing a cyclic voltage differential between said electrodes periodically reaching a value to stop the flow of current once started, and means impressing on said time control a cyclic voltage having a control component derived from said responsive means and of a pattern to actuate said fluid control valve in corrective direction and to an extent proportional to the extent of departure of said characteristic from a definite value in either direction between definite limits and to a definite large extent without regard to the extent of such departure beyond said limits.

8. For an electrically actuated fluid control valve and means responsive to characteristics of material effected in amount by the flow of such fluid, means supplying electric power for actuating said control valve including a thermionic valve having a plurality of electrodes and a voltage-responsive control of ignition time, means impressing a cyclic voltage differential between said electrodes periodically reaching a value to stop the flow of current once started, and means impressing on said time control a cyclic voltage having a control component derived from said responsive means and of a pattern to actuate said fluid control valve in corrective direction and to an extent proportional to the extent of departure of said characteristic from a definite value in either direction between definite limits and to a definite large extent without regard to the extent of such departure beyond said limits.

9. For an electrically actuated fluid control valve and means responsive to characteristics of material effected in amount by the flow of such fluid, means supplying electric power for actuating said control valve including a thermionic valve having a plurality of electrodes and a voltage-responsive control of ignition time, means impressing a cyclic voltage differential between said electrodes periodically reaching a value to stop the flow of current once started, and means impressing on said time control a cyclic voltage having a direct current control component derived from said responsive means and of a pattern to actuate said fluid control valve in corrective direction and to an extent proportional to the extent of departure of said characteristic from a definite value in either direction between definite limits and to a definite large extent without regard to the extent of such departure beyond said limits.

WILFRED H. HOWE.